the dam or other structure is subjected in use.

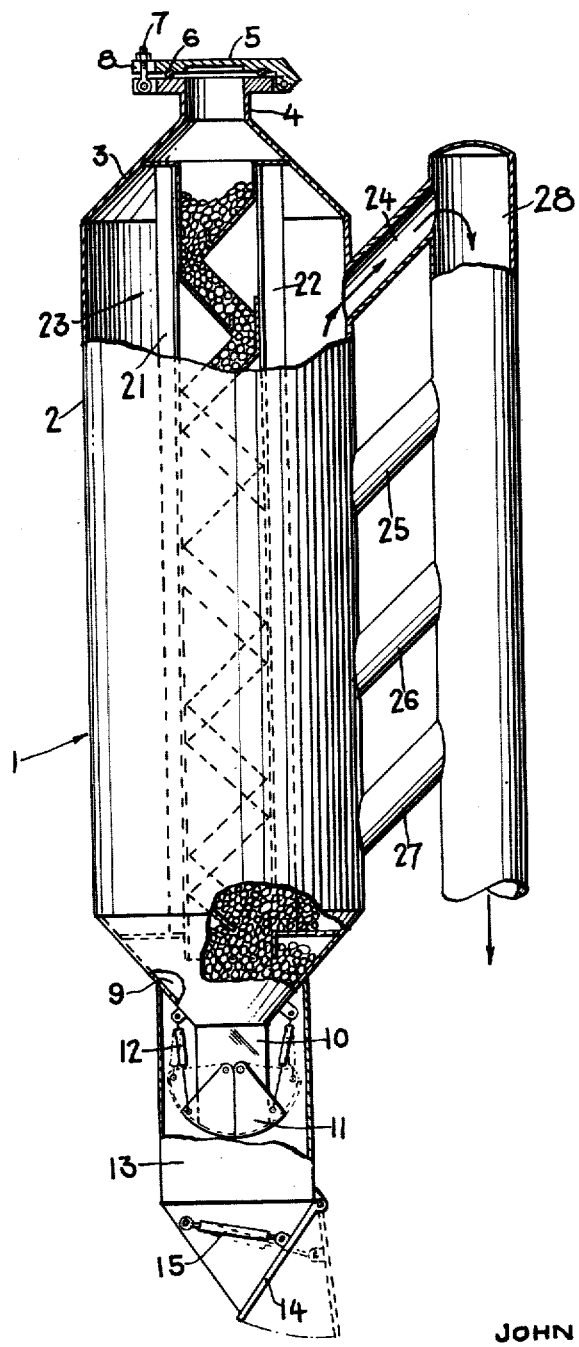

United States Patent Office 3,108,448
Patented Oct. 29, 1963

3,108,448
METHOD OF COOLING CEMENT MIXES FOR CONCRETE
John R. Hightower, Hermosa Beach, Calif., assignor to John R. Hightower, Samuel W. Croll, Jr., James T. Reynolds, and John D. Hightower, as joint trustees and Croll-Reynolds Co., Inc., Westfield, N.J., a corporation of New Jersey
Filed Jan. 7, 1960, Ser. No. 970
6 Claims. (Cl. 62—63)

This invention relates to a method of decreasing the placement temperature of cement mixes for concrete, especially when used in massive structures, such as concrete dams and the like.

The basic problem in massive concrete structures is to prevent the development of temperature cracks, by placing the cement mixes for concrete so that it reaches its final set at a temperature as close as possible to its ultimate temperature in service, which ultimate temperature is determined by the service conditions and is normally controlled by the mean air and water temperature to which the dam or other structure is subjected in use.

For massive concrete structures, such as dams and the like, present day specifications require cooling the concrete mix, to be placed, to a temperature sufficiently below the average ambient temperature to which the structure is subjected to assure that the heat liberated in the placed concrete mix will not raise its temperature to the level where gelatinization can occur and prevent its setting.

Various methods of reducing the temperature of massive concrete structures have been used, such as limiting the size of the pourings of the individual sections, circulating cooling water through pipes imbedded in the concrete, cooling the mix by the use of ice water in the mixing operation, cooling the sand and/or aggregate by inundation in refrigerated water, cooling the aggregate by refrigerated air blast and other ways, but none of these methods has proven satisfactory for a number of reasons.

With the advent of lower and lower placement temperatures the cooling which can be reached by refrigerating the mixing water or by using ice in the mixing operation, or by inundating or air blast cooling of the sand and aggregate is no longer sufficient, plus the fact that the cost of these methods of cooling is inordinately high, and complications in the handling of the sand and aggregate cooled by inundation or air blast cooling greatly increase the cost of attempting to reduce the placement temperatures of cement mixes for concrete in these ways.

One of the objects of this invention is to provide an economical method of reducing the placement temperature of cement mixes for concrete which will not materially increase the handling costs for the sand and aggregate or complicate their handling in the concrete mixing and placing operations.

Another object of the invention is to provide a method of cooling sand and aggregate for use in concrete structures which will permit the use of greater amounts of refrigerated water or greater amounts of ice and water mixtures in the concrete mixing operation without increasing the ratio of water to cement in the specified mixture.

Another object of the invention is to provide a method of decreasing the placement temperature of cement mixes for concrete in which cooled and dried sand and aggregate are mixed with cement and refrigerated water in such a ratio that more refrigerated water may be used than if the sand and aggregate is cooled without partial drying or reduction of moisture content.

Another object of the invention is to provide a method of reducing the placing temperature of concrete mixes which comprises simultaneously cooling and reducing the moisture content of sand and aggregate by evaporating water from the surface thereof under vacuum to simultaneously cool the sand and aggregate and the residual water contained therein and to reduce the water content of the sand and aggregate and using cooled water in an amount equivalent to the amount removed from the sand and aggregate (in addition to the amount of allowable water based on the original water content of the sand and aggregate) in mixing the concrete whereby the temperature of the mix is reduced below the required placing temperatures of the specifications.

Various other objects and advantages of this invention will appear as this description proceeds. This application is a continuation-in-part of my copending application Serial No. 744,275, filed June 24, 1958, now abandoned.

The strength and durability of concrete produced from prime quality aggregates, sand, cement and water depends, all other conditions being equal, on the water cement ratio. The lower the total water included, the stronger the concrete will be, so long as sufficient water is provided to enable the cement to hydrate. For this reason the total amount of water which may be used, including the water in the sand and aggregate, is strictly limited in the normal concrete specifications. However, the amount of surface moisture in the sand and aggregate usually represents a substantial portion of the total allowable water permitted in the mix and normally the specifications require that the amount of free refrigerated water which may be used in the final mixing be reduced by the amount of water contained in the sand and aggregate.

Basically my invention comprises subjecting the sand and/or aggregate to be used in the concrete mix to vacuum cooling by evaporation of moisture from the surface thereof under vacuum whereby the sand and aggregate is not only cooled, but the relative moisture of the sand and aggregate (before the cooling operation) is reduced by the order of 1% or more on an absolute basis or by 10% or more on a relative basis, thereby permitting the use of more cooled water in the final concrete mixing operation.

The method and/or apparatus in which the simultaneous reduction of temperature and moisture content of the sand and aggregate is accomplished is immaterial as long as the method and apparatus is capable of reducing the temperature of the sand and aggregate preferably to below 40° F., and of simultaneously reducing the moisture content by the order of 1% or more on the absolute basis or by 10% or more on a relative basis. The reduction of moisture content on a relative basis is preferably between 10% and 25%.

The accompanying drawing shows a cross-sectional view of one form of apparatus in which the principal step of the method may be carried out. Other vacuum cooling apparatus such as that shown in United States Patent No. 2,278,701, suitably sized and modified for the purpose, may be used to cool and simultaneously reduce the moisture content of sand and aggregate for use in reducing the placement temperature of cement mixes for concrete or apparatus of the type illustrated in FIGS. 1 to 7 of my said copending application Serial No. 744,275 may be used.

As illustrated in the drawings, the sand or aggregate to be simultaneously cooled and reduced in moisture content is charged into a silo 1 having a vertical cylindrical shell 2 with a top cone 3 and an inlet neck 4 having a cap 5 bearing an O-ring gasket 6, and closed by locking the eyebolt 7 in the yoke 8. Below shell 2 the silo has an inverted frusto-conical bottom 9 with its bottom outlet 10 closed by an ordinary clam-shell gate 11 operated by pneumatic arms 12.

Since a clam-shell gate is not readily vacuum-tightly closed, bottom outlet 10 is enclosed in a vacuum housing 13 that is vacuum-tightly closed by its swingable flap gate 14 with suitable compressible gasket (not shown), and operated by the pneumatic arm 15.

Carried on usual-type uprights 21 and 22 and supported concentrically by adequate brackets and braces (not completely shown) within silo 1 is an ordinary rock ladder designated 23 (as a whole). The rock ladder is open on all four sides so that sand or aggregate resting thereon is subjected to the vacuum conditions in the silo on all exposed sides. At desirable elevations from one side of shell 2, and communicating with its interior, vacuum conduits 24, 25, 26 and 27 extend to, and communicate with the interior of, vacuum manifold 28.

The vacuum manifold 28, conveniently at its bottom, connects to suitable exhausting equipment, such as steam ejectors or mechanical vacuum pump, and the like. As an added precaution, if desired, a vacuum line (not shown) can join the interior of housing 13 with that of manifold 28.

In operation with the apparatus shown, with clam-shell gate 11 closed and top cap 5 open, coarse aggregates, such as crushed stone, raised to the top from its stockpile, by a suitable elevator, into the top of silo 1, drops down the successive flights of rock ladder 23 into bottom outlet 10. It builds up from there to fill conical bottom 9 and thereafter, by overflowing from each successively higher flight of the rock ladder, to fill the silo.

Top cap 5 then is vacuum-tightly closed and so also is flap gate 14. Evacuation of the air surrounding the aggregate in the silo is then begun.

The apparatus of the type shown is considerably flexible in size. For example, it can be constructed with a silo sixty-four feet high by eleven feet in inside diameter, and using a vacuum manifold or header three and one-half feet in diameter. These dimensions for the cooling silo are not necessarily maximum.

While the apparatus illustrated is primarily intended for cooling and reducing the water content of aggregate it may be used to cool and reduce the water content of sand as well.

The evacuation of the air first removes the air from the silo 1 and from the spaces surrounding the sand and/or aggregate and as the pressure is lowered to the vapor pressure of water at the temperature of the sand or aggregate (for example to one inch absolute for sand at about 80° F.) the water begins to evaporate thereby extracting heat from the sand or aggregate particles and from the non-evaporated water left in the sand or aggregate by an amount equal to the latent heat of vaporization of the water evaporated.

In cooling sand the rate of lowering the absolute pressure is controlled to avoid strong enough currents to stir up undesirable sand dust and also to avoid local freezing that would interfere with withdrawal of air and water vapor. The vacuum operation is continued long enough to bring the absolute pressure low enough to enable the evaporation of water to chill the sand or aggregate to the desired final low temperature. For example, in about fifty-five minutes sand can be cooled to about 40° F. at an absolute pressure of about one quarter inch of mercury. Temperatures as low as 33° F. for aggregate and 35° F. for sand may be readily attained. The sand and aggregate is normally cooled to between 33° F. and 50° F. dependent upon the specifications and the ambient air temperature on the particular day.

When the desired temperature for the sand and/or aggregate has been reached the evacuation is discontinued. The vacuum is broken, for example, by opening a valve in a leak line (not shown) into the silo 1. The bottom of the silo is then opened by opening flap gate 14 and clamshell gates 11 and the cooled and partially dehumidified sand or aggregate is discharged, for example, into insulated storage tanks or onto suitable conveyors for conveyance to the concrete mixing plant.

As an example of the operation of the invention one hundred and five thousand pounds of river sand (occupying 1050 cubic feet) containing between six to eight percent of water were charged into a silo of ten feet six inches inside diameter, having a fourteen foot high outer louvered-cylinder with twelve segments, and a sixteen foot seven inches high four-sided louvered central flue with opposing sides at about eighteen inches apart, supported about four and one-half feet above the lower end of the bottom cone.

With the starting temperature of the sand charge at 80° F., operation of a primer steam ejector in five minutes reduced the pressure in the silo to three inches (Hg) absolute. Then with operation of a booster steam ejector, the pressure dropped soon thereafter to two inches absolute and somewhat later to one inch, and after fifty-five minutes to one-quarter of an inch absolute, with the sand temperature reduced to 40° F., when the evacuation was discontinued. The thus chilled sand showed a moisture loss of about one percent of the wet sand on the absolute basis. The overall cooling cycle was an hour.

Assuming an average water content of 7% in the sand the 1050 cubic feet of sand contained 73.5 cubic feet, or 4594 lbs. of water. One percent or $\frac{1}{7}$ of the water, equivalent to 656 lbs., had been removed in the vacuum cooling. In addition to cooling the sand from 80° F. to 40° F., 656 lbs. of water was removed therefrom which permitted 656 lbs. or 82 gallons more cooled water (for example at 35° F.) to be used in mixing this amount of sand into the concrete mix than could have been used had the cooled sand contained its original (assumed 7%) water content.

In a like manner all the aggregate to be used in a concrete mix may be cooled and its water content reduced so as to permit still greater use of cooled water in the mixing operation without exceeding the overall water to cement ratio fixed by the job specifications.

Thus in a typical specification allowing the use of 200 lbs. of water per cubic yard of concrete the normal moisture content of the ingredients of the mix may run as follows:

| Material | Percent Water | Lb./Yd. |
|---|---|---|
| Cobbles, 3 to 6 in | | 800 |
| Surface water | 1 | 8 |
| Coarse stone, 1½ to 3 in | | 700 |
| Surface water | 1 | 7 |
| Medium stone, ¾ to 1½ in | | 650 |
| Surface water | 1 | 6.5 |
| Fine gravel, ⅛ to ¾ in | | 600 |
| Surface water | 1 | 6 |
| Sand | | 1,000 |
| Surface water | 5 | 50 |
| Cement | | 282 |

With the total water content, including surface water on the sand and aggregate, limited to 200 lbs. per cubic yard of concrete, the amount of cooled water (35° F.) which can be used is 200−77.5 (the total surface water content of the sand and aggregate) =122.5 lbs. free cooled water. However, if the sand and aggregate has been simultaneously cooled and its relative water content reduced by 15% by vacuum cooling, the amount of free cooled water which can be used is increased by 15% of 77.5 lbs. or 11.6 lbs. per cubic yard. In addition to the greater cooling provided by this additional amount of free cooled water, the lowering of the placing temperature of the mix and the additional free water retards the heat released by hydration and settling of the concrete and increases the period the concrete is workable.

In another typical specification the ingredients for a 4 cubic yard mix batch are:

| Ingredient | Percent | Pound | Surface Water | |
|---|---|---|---|---|
| | | | Percent | Lbs. |
| Sand | 29 | 4,283 | 2 | 85 |
| Gravel to ¾ in | 16½ | 2,437 | 1 | 24.3 |
| Stones, ¾ to 1½ in | 16½ | 2,437 | 1 | 24.3 |
| Stones, ½ to 3 in | 17 | 2,510 | 1 | 25.1 |
| Rocks, 3 to 6 in | 21 | 3,100 | 1 | 31 |
| Cement | | 940 | | |
| Maximum water | | 667 | | |
| Total | | | | 189.7 |

Permissible free water 667−189.7 (surface water) =477.3 lbs.

When the sand and aggregate are cooled from, for example 80° F. to 40° F., by vacuum cooling as described above, and the relative surface water content is reduced by 15%, the amount of surface water in the sand and aggregate is reduced to 160 lbs. and 29.7 lbs. of additional free cooled water, or a total of 507 lbs. of free cooled (35° F.) water per 4 cubic yard batch may be used in mixing the concrete without exceeding the prescribed water to cement ratio.

In the two preceding examples, used for the purpose of illustrating the invention, the free water content of the sand has been chosen at 5% and 2% respectively, and the water content of the aggregate at 1%. In many cases, however, the moisture content of the sand will be between 6 and 8% and of the aggregate between 1 to 2%. In such cases the amount of surface water reduction in the vacuum cooling operation is even greater and the amount of free cooled water which may be used in the mixing operation is further increased.

In vacuum cooling the average sand used for concrete mixes, a starting minimum of 2 percent of surface water is desirable to reach a temperature of 40° F. or below in the vacuum cooling operation. In some instances the moisture content may be as low as one percent or less as long as it is sufficient to enable the desired low temperature to be reached. The preferred maximum starting moisture content for sand is one that will permit it to contain a residual moisture content of about eight percent when the desired lower temperature of the sand (including its non-evaporated water) is reached. The preferred starting water content of the sand for ideal operating conditions is eight percent. The starting moisture content of the aggregate should be between 1 and 2 percent, although a higher starting moisture content can be tolerated in the vacuum cooling operation.

Generally, the minimum effective starting moisture or water content that should be present in the sand or aggregate is determined from a consideration of the temperature which the component to be cooled has at the start of the operation, the final temperature to which it is to be cooled, and its specific heat. Thus, there will need to be present at the start at least that amount of water that could be evaporated by the amount of heat that the component must give up or lose in being cooled from its starting temperature to the selected lower temperature to which it is to be cooled.

In the operation described in the illustrative examples, the capacity of the vacuum equipment should be such as to remove water vapor at the rate of at least eighteen hundred pounds per hour at the 80° F. starting temperature. The vapor removal at the end of the operation (40° F., one-quarter inch Hg) is about seven hundred and fifty pounds per hour.

Considered broadly, the invention comprises loading the non-plastic ingredient for concrete to be cooled into a vacuum-tightly closeable vessel communicating with a source for producing subatmospheric pressure in that vessel, and with the particles of the ingredient to be cooled bearing a certain amount of water, and subjecting such water-bearing particles housed in that vessel to subatmospheric pressure sufficient first to cause the air to be removed from about the ingredient to be cooled therein and then to reduce the pressure in the vessel to a level below the vapor pressure of the water on that ingredient, whereby the water on the surfaces of its particles or pieces is caused to evaporate and thereby to extract heat therefrom and from any non-evaporated water remaining in the ingredient and in an amount equal to the latent heat of vaporization of the water being evaporated from their surfaces, and continuing to lower the subatmospheric pressure about the ingredient being cooled until it reaches the desired lower temperature and is reduced in moisture content to the corresponding amount and in then using free cooled water in the concrete mix to equal the amount withdrawn from the sand and aggregate plus the amount of free water which could have been used had the sand and aggregate not had their water content reduced in the cooling operation.

While I have given certain examples for the purpose of illustrating the applications and advantages of my invention, it will be understood that the application of my invention is not limited to the examples given and that many modifications and changes may be made within the spirit of the invention and the scope of the following claims.

I claim:

1. The method of reducing the placing temperature of a cement mix containing aggregate which comprises cooling and simultaneously reducing the water content of the aggregate containing at least 1% water by evaporating water therefrom under vacuum, mixing the so-cooled aggregate with cement and using sufficient cooled water which added to the reduced water content of the so-cooled aggregate equals the prescribed water to cement ratio of the job specifications.

2. The method of claim 1 in which the aggregate is cooled to about 40° F. and the water is cooled to about 35° F.

3. The method of claim 1 in which the reduction in the relative water content of the aggregate is between 10 and 25%.

4. The method of preparing aggregate for use in cement mixes, to be placed at a temperature below 50° F., which comprises evaporating water from said aggregate containing at least 1% water under vacuum and simultaneously reducing the temperature of said aggregate to below 45° F. and water content of said aggregate to below 90% of the water content of said aggregate at the start of the temperature reduction step whereby when said cooled and partially dried aggregate is incorporated into a concrete mix more cold water may be added to the mix without exceeding a specified water to cement ratio than could have been added had the said cooled aggregate not had its said water content reduced.

5. The method of lowering the placing temperature of a cement mix containing aggregate, including sand, cement and cold water which comprises cooling and simultaneously reducing the moisture content of the said sand containing at least 2% water by evaporating sufficient water therefrom under vacuum whereby said so-cooled sand has a temperature below 45° F. and contains at least 1% less moisture on an absolute basis, and adding said so-cooled sand to said cement mix together with sufficient additional water cooled to a temperature below 45° F. to equal the prescribed water to cement ratio of the job specifications.

6. The method of lowering the placing temperature of a cement mix containing aggregate, including sand, cement and cold water which comprises cooling and simultaneously reducing the moisture content of the said aggregate, including sand, containing at least 2% water by evaporating sufficient water therefrom under vacuum whereby said so-cooled aggregate, including sand, has a temperature below 45° F. and contains at least 1% less moisture on an absolute basis, and adding said so-cooled aggregate, including sand, to said cement mix together with sufficient additional water cooled to a temperature below 45° F. to equal the prescribed water to cement ratio of the job specifications.

References Cited in the file of this patent

UNITED STATES PATENTS

| | | |
|---|---|---|
| 789,807 | Holl | May 16, 1905 |
| 2,593,327 | McIlvaine | Apr. 15, 1952 |
| 2,595,631 | Bertsch | May 6, 1952 |
| 2,648,206 | Carr | Aug. 11, 1953 |
| 2,758,445 | Saxe | Aug. 14, 1956 |

FOREIGN PATENTS

| | | |
|---|---|---|
| 7,096 | Great Britain | of 1900 |

UNITED STATES PATENT OFFICE
CERTIFICATE OF CORRECTION

Patent No. 3,108,448                          October 29, 1963

John R. Hightower

It is hereby certified that error appears in the above numbered patent requiring correction and that the said Letters Patent should read as corrected below.

In the grant, lines 2 to 5, for "assignor to John R. Hightower, Samuel W. Croll, Jr., James T. Reynolds, and John D. Hightower, as joint trustees, and Croll-Reynolds Co., Inc., of Westfield, New Jersey, a corporation of New Jersy," read -- assignor to said John R. Hightower, Samuel W. Croll, Jr., James T. Reynolds, and John D. Hightower, as joint trustees, --; lines 14 to 16, for "John R. Hightower, Samuel W. Croll, Jr., James T. Reynolds, and John D. Hightower, as joint trustees, their successors or assigns, and Croll-Reynolds Co., Inc., its successors" read -- John R. Hightower, Samuel W. Croll, Jr., James T. Reynolds, and John D. Hightower, as joint trustees, their successors --; in the heading to the printed specification, lines 4 to 8, for "assignor to John R. Hightower, Samuel W. Croll, Jr., James T. Reynolds, and John D. Hightower, as joint trustees and Croll-Reynolds Co., Inc., Westfield, N. J., a corporation of New Jersey" read -- assignor to said John R. Hightower, Samuel W. Croll, Jr., James T. Reynolds, and John D. Hightower, as joint trustees --; column 2, line 24, strike out ", now abandoned".

Signed and sealed this 15th day of March 1966.

(SEAL)
Attest:

ERNEST W. SWIDER                         EDWARD J. BRENNER
Attesting Officer                        Commissioner of Patents